(12) United States Patent
Fiaz et al.

(10) Patent No.: US 12,260,674 B2
(45) Date of Patent: Mar. 25, 2025

(54) SYSTEM AND METHOD FOR ATTENTION-AWARE RELATION MIXER FOR PERSON SEARCH

(71) Applicant: Mohamed bin Zayed University of Artificial Intelligence, Abu Dhabi (AE)

(72) Inventors: Mustansar Fiaz, Abu Dhabi (AE); Hisham Cholakkal, Abu Dhabi (AE); Sanath Narayan, Abu Dhabi (AE); Rao Muhammad Anwer, Abu Dhabi (AE); Fahad Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

(21) Appl. No.: 17/983,741

(22) Filed: Nov. 9, 2022

(65) Prior Publication Data
US 2024/0153308 A1 May 9, 2024

(51) Int. Cl.
*G06V 40/16* (2022.01)
*G06V 10/82* (2022.01)
(Continued)

(52) U.S. Cl.
CPC ............ *G06V 40/173* (2022.01); *G06V 10/82* (2022.01); *G06V 20/59* (2022.01); *H04N 7/181* (2013.01)

(58) Field of Classification Search
CPC ...... G06V 40/173; G06V 20/59; G06V 10/82; H04N 7/181
See application file for complete search history.

(56) References Cited

U.S. PATENT DOCUMENTS 10,713,794 B1 * 7/2020 He .......................... G06N 3/084
10,818,028 B2 * 10/2020 Chakraborty .......... G06V 20/53
(Continued)

FOREIGN PATENT DOCUMENTS

| CN | 113869233 A | 12/2021 |
| CN | 114038052 A | 2/2022 |
| CN | 114463604 A | 5/2022 |

OTHER PUBLICATIONS

Spatial-Attention Location-Aware Multi-Object Tracking (Jun Han, Weixing Li, Feng Pan, Dongdong Zheng, Qi Gao,. School of Automation, Beijing Institute of Technology, Beijing 100081, P. R. China, Proceedings of the 41st Chinese Control Conference Jul. 25-27, 2022, Hefei, China) (Year: 2022).*

(Continued)

*Primary Examiner* — Rowina J Cattungal
(74) *Attorney, Agent, or Firm* — Oblon, McClelland, Maier & Neustadt, L.L.P.

(57) ABSTRACT

A video system and method for person search includes video cameras for capturing video images, a display device, and a computer system. The computer system including a deep learning network to determine person images, from among the video images, matching a target query person. The deep learning network having a person detection branch, a person re-identification branch, and an attention-aware relation mixer connected to the person detection branch and to the person re-identification branch. The attention-aware relation mixer including a relation mixer having a spatial and channel mixer that performs spatial attention followed by spatial mixing (tokenized multi-layered perceptron) and channel attention followed by channel mixing (channel multi-layered perceptron), and a joint spatio-channel attention layer that utilizes 3D attention weights to modulate 3D spatio-channel region of interest features and aggregate the features with output of the relation mixer. A display device displays matching person images for the person search.

16 Claims, 14 Drawing Sheets

(51) Int. Cl.
  *G06V 20/59*   (2022.01)
  *H04N 7/18*   (2006.01)

(56) References Cited

U.S. PATENT DOCUMENTS

| | | |
|---|---|---|
| 2013/0343642 A1 | 12/2013 | Kuo et al. |
| 2018/0174457 A1* | 6/2018 | Taylor .................... G06N 3/045 |
| 2020/0089977 A1* | 3/2020 | Lakshmi Narayanan ................... G06F 18/253 |
| 2020/0134306 A1 | 4/2020 | Zhu et al. |

OTHER PUBLICATIONS

Dense Convolutional Network and Its Application in Medical Image Analysis, Tao Zhou , XinYu Ye, HuiLing Lu , Xiaomin Zheng, Shi Qiu, and YunCan Liu1, School of Computer Science and Engineering, North Minzu University, Yinchuan 750021, China,2022 (Year: 2022).*

Mlp-mixer: An all-mlp architecture for vision. Advances in Neural Information Processing Systems 34 (2021), Tolstikhin (Year: 2021).*

Yao, et al. ; Large-scale person re-identification as retrieval ; IEEE International Conference on Multimedia and Expo (ICME) ; Jul. 10-14, 2017 ; Abstract Only ; 4 Pages.

Di Chen et al. "Person Search via A Mask-Guided Two-Stream CNN Model," In: Proceedings of the European conference on computer vision (ECCV), pp. 734-760 (2018).

* cited by examiner

SYSTEM AND METHOD FOR ATTENTION-AWARE RELATION MIXER FOR PERSON SEARCH

BACKGROUND

Technical Field

The present disclosure is directed to a person search system and method in the case that video images have been captured across a camera network having video cameras at different locations. The person search method is implemented with an attention-aware relation mixer (ARM) module that captures a global relation between different local person regions through global mixing of local information while simultaneously suppressing background distractions within a region of interest. In addition, a joint spatio-channel attention layer is included within the ARM module to further improve foreground-background (FG-BG) delineation of features.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Person search is a computer vision problem that involves applying a query image containing a person to gallery images in order to find other images of the same person. Person search involves identifying a person in the gallery images, particularly in a case where multiple cameras were used to capture the gallery images. A sub-task of person search can include pedestrian detection. Pedestrian detection is a special case of object detection, where object detection is the detection of persons in an image. Pedestrian detection involves a case where an object to be detected is a pedestrian. Pedestrian detection typically places a bounding box around a detected pedestrian.

Another sub-task of person search is person re-identification. Person re-identification involves the identification of person images observed in different camera views, where the identification is based on appearance information without relying on spatio-temporal information.

Pedestrian detection can be used in applications such as automatic driving and intelligent surveillance, where it is necessary to detect the presence of a pedestrian in an image/video. Person recognition/identification can be used in applications where it is necessary to not only detect a pedestrian, but also to identify the detected person. Person recognition can involve applications such as automated entry, passenger flow monitoring, or behavior analysis for automated driving and surveillance.

Person search is a challenging computer vision problem because the objective is to find a target query person in a gallery of whole scene images. Person search methods need to perform the task of pedestrian detection on the uncropped gallery images and perform a task of re-identification (re-id) of the detected pedestrians. Conventional methods of person search perform the person detection and re-id tasks as two steps, or as a single consolidated step. Most conventional two-step person search methods address this problem by first detecting the pedestrians, followed by cropping and resizing into a fixed resolution before passing to the re-id network that identifies the cropped pedestrian. See Zheng et al. (2017); Chen, D., Zhang, S., Ouyang, W., Yang, J., Tai, Y.: Person search via a mask-guided two-stream cnn model. In: Proceedings of the european conference on computer vision (ECCV). pp. 734-750 (2018); Han, C., Ye, J., Zhong, Y., Tan, X., Zhang, C., Gao, C., Sang, N.: Re-id driven localization refinement for person search. In: Proceedings of the IEEE/CVF International Conference on Computer Vision. pp. 9814-9823 (2019); Dong, W., Zhang, Z., Song, C., Tan, T.: Instance guided proposal network for person search. In: Proceedings of the IEEE/CVF Conference on Computer Vision and Pattern Recognition. pp. 2585-2594 (2020); and Lan, X., Zhu, X., Gong, S.: Person search by multi-scale matching. In: Proceedings of the European conference on computer vision (ECCV). pp. 536-552 (2018), each incorporated herein by reference in their entirety. Unlike the presently disclosed embodiments, these methods generally employ two different backbone networks for the detection and re-identification tasks, respectively.

On the other hand, several one-step person search methods employ feature pooling strategies such as, RoIPooling or RoIAlign pooling to obtain a scale-invariant representation for the re-id sub-task. Chen et al. proposed a two-step method to learn robust person features by exploiting person foreground maps using pretrained segmentation network. See Chen et al. (2018). Han et al. introduced a bounding box refinement mechanism for person localization. See Han et al. (2019). Dong et al, utilized the similarity between the query and query-like features to reduce the number of proposals for re-identification. See Dong et al. (2020). Zhang et al. introduced the challenging PRW dataset. See Zhang et al. (2017). A multi-scale feature pyramid was introduced in Lan et al. for improving person search under scale variations. See Lan et al. (2018). Wang et al. proposed a method to address the inconsistency between the detection and re-id sub-tasks. See Wang, C., Ma, B., Chang, H., Shan, S., Chen, X.: Tets: A task-consistent two-stage framework for person search. In: Proceedings of the IEEE/CVF Conference on Computer Vision and Pattern Recognition. pp. 11952-11961 (2020), incorporated herein by reference in its entirety.

Most one-step person search methods are developed based on the Faster R-CNN object detector. See Xiao et al. (2017); Xiao, J., Xie, Y., Tillo, T., Huang, K., Wei, Y., Feng, J.: Ian: the individual aggregation network for person search. Pattern Recognition 87, 332-340 (2019); Liu, H., Feng, J., Jie, Z., Jayashree, K., Zhao, B., Qi, M., Jiang, J., Yan, S.: Neural person search machines. In: Proceedings of the IEEE International Conference on Computer Vision. pp. 493-501 (2017); Chang, X., Huang, P. Y., Shen, Y. D., Liang, X., Yang, Y., Hauptmann, A. G.: Rcaa: Relational context-aware agents for person search. In: Proceedings of the European Conference on Computer Vision (ECCV). pp. 84-100 (2018); Yan et al. (2019); Dong, W., Zhang, Z., Song, C., Tan, T.: Bi-directional interaction network for person search. In: Proceedings of the IEEE/CVF Conference on Computer Vision and Pattern Recognition. pp. 2839-2848 (2020); Chen et al. (2020); Munjal, B., Amin, S., Tombari, F., Galasso, F.: Query-guided end-to-end person search. In: Proceedings of the IEEE/CVF Conference on Computer Vision and Pattern Recognition. pp. 811-820 (2019); Han, B. J., Ko, K., Sim, J. Y.: End-to-end trainable trident person search network using adaptive gradient propagation. In: Proceedings of the IEEE/CVF International Conference on Computer Vision. pp. 925-933 (2021); Li et al.; and Ren, S., He, K., Girshick, R., Sun, J.: Faster r-cnn: Towards real-time object detection with region proposal networks. Advances in neural information processing systems 28 (2015), each incorporated herein by reference in their entirety. These methods of one-step person search generally introduce an additional branch to Faster R-CNN and jointly address the detection and re-id sub-tasks. One of the earliest Faster R-CNN based one-step person methods proposed an online instance matching (OIM) loss. See Xiao et al. (2017). Xiao et al. introduced a center loss to explore intra-class compactness. See Xiao et al. (2019). For generating proposed persons, Liu et al. introduced a mechanism to iteratively shrink the search area based on query guidance. See Liu et al. (2017). Similarly, Chang et al. used reinforcement learning to address the person search problem. See Chang et al. (2018). Chang et al. exploited complementary cues based on graph learning framework. See Yan et al. (2019). Dong et al. proposed Siamese based Bi-directional Interaction Network (BINet) to mitigate redundant context information outside the BBoxes. See Dong et al. (2020). To the contrary, Chen et al. proposed Norm Aware Embedding (NAE) to alleviate the conflict between person localization and re-identification by computing magnitude and angle of the embedded features respectively. See Chen et al. (2020).

Chen at al. developed a Hierarchical Online Instance Matching loss to guide the feature learning by exploiting the hierarchical relationship between detection and re-identification. See Chen, D., Zhang, S., Ouyang, W., Yang, J., Schiele, B.: Hierarchical online instance matching for person search. In: Proceedings of the AAAI Conference on Artificial Intelligence. vol. 34, pp. 10518-10525 (2020), incorporated herein by reference in its entirety. A query-guided proposal network (QGPN) was proposed by Munjal et al. to learn query guided re-identification score. See Munjal et al. (2019). Li et al. proposed a Sequential End-to-end Network (SeqNet) to refine the proposals by introducing Faster R-CNN as a proposal generator into the NAE pipeline to get refined features for detection and re-identification. See Li et al. (2021).

Despite the various methods that have been pursued, the Faster R-CNN based one-step person search methods generally fail when the target person image undergoes large appearance deformations or the target person image includes distracting background objects within a region of interest.

It is one object of the present disclosure to describe a system and method that enables accurate detection and re-identification of person instances under challenging scenarios such as pose variation, occlusion and distracting backgrounds.

SUMMARY

An aspect is a video system for person search, that can include at least one video camera for capturing video images; a display device; and a computer system having processing circuitry and memory. The processing circuitry configured to receive a target query person, perform machine learning using a deep learning network to determine person images, from among the video images, matching the target query person. The deep learning network having a person detection branch; a person re-identification branch; an attention-aware relation mixer connected to the person detection branch and to the person re-identification branch. The attention-aware relation mixer (ARM) including a relation mixer having a spatial and channel mixer that performs spatial attention followed by spatial mixing (tokenized multi-layered perceptron) and channel attention followed by channel mixing (channel multi-layered perceptron), and a joint spatio-channel attention layer that utilizes 3D attention weights to modulate 3D spatio-channel region of interest features and aggregate the features with output of the relation mixer. The display device is configured to display matching person images for the person search.

A further aspect is a non-transitory computer readable storage medium storing a computer program for person search, which when executed by processing circuitry performs a method that can include receiving a target query person, performing machine learning using a deep learning network to determine person images, from among video images captured by at least one video camera, that match the target query person. The deep learning network having a person detection branch; a person re-identification branch; an attention-aware relation mixer (ARM) connected to the person detection branch and to the person re-identification branch. The attention-aware relation mixer including a relation mixer having a spatial and channel mixer that performs spatial attention followed by spatial mixing (tokenized multi-layered perceptron) and channel attention followed by channel mixing (channel multi-layered perceptron), and a joint spatio-channel attention layer that utilizes 3D attention weights to modulate 3D spatio-channel region of interest features and aggregate the features with output of the relation mixer. The method includes displaying the matching person images for the person search.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
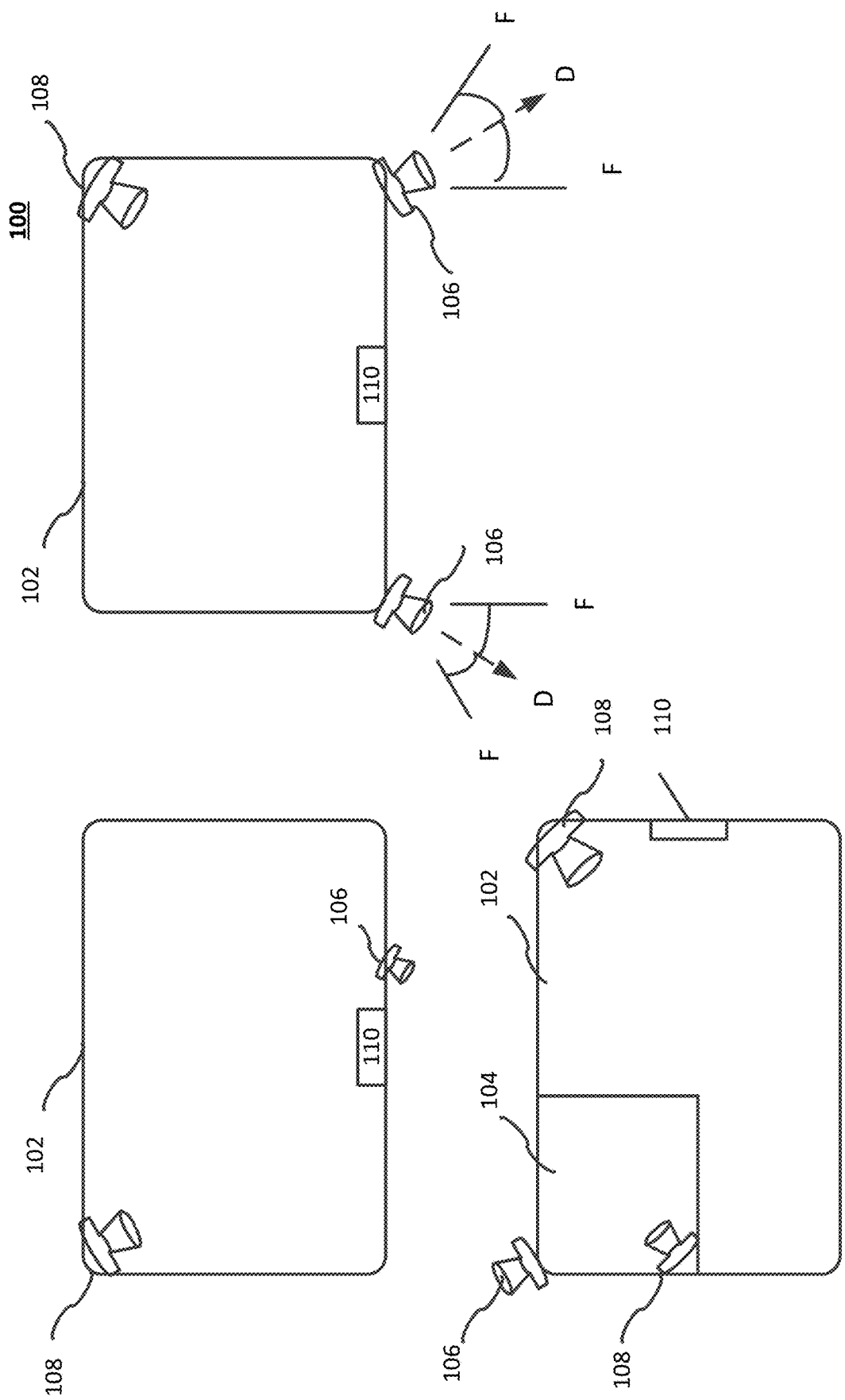
FIG. 1 illustrates a layout in which multiple cameras are located at different locations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The present disclosure relates to a person search system and method that involves identifying a person in a case where multiple cameras at different locations are used to capture gallery images. The present disclosure provides a solution that enables accurate detection and re-identification of person instances under challenging scenarios such as pose variation and occlusions and distracting backgrounds.

FIG. 1 illustrates a layout in which multiple cameras are located at different locations. In some embodiments, multiple cameras may be located in different locations inside a room, along a hallway, or inside multiple rooms in a building, or inside and outside multiple buildings, vehicles, enclosed spaces or open spaces within a local area. Referring to FIG. 1, a general room 102 includes at least one entrance 110, and at least one surveillance camera 108 mounted inside, or facing inside, the room 102. There can also be one or more surveillance cameras 106 mounted outside, or facing outside, the room 102. A room 102 or building floor may contain one or more interior rooms 104. The cameras 106, 108 may face different directions D in order to cover a wider field of view F than can be obtained by a single camera.

The video cameras 106, 108 may be stationary, or may be motorized to move in a regular pattern. The video cameras 106, 108 may be started or stopped by motion activation. Some video cameras may be capable of night vision, such as infrared cameras, or may be equipped with different types of cameras and/or lenses for different conditions, such as day and night, and wide angle or near view.

Provided multiple cameras at different locations, a person of interest may appear in multiple video images, possibly in a location where there are other people, in different locations with different lighting conditions, in videos taken at different view angles, as well as in a dynamic environment where people, as well as the person of interest, are moving and partially occluded. There can be video images where the person of interest is facing away from a camera and/or is at different distances from the camera. There may also be video images in which a person of interest is wearing different clothing or has different styling characteristics relating to hair or cosmetics, or has accessories such as bags, walking devices and the like, due to videos being captured at different periods of time. In addition, different cameras may have a variety of resolutions and frame rates.

Despite these conditions, there is a need to accurately identify a person of interest in video images taken using multiple different cameras.

Figure 2:
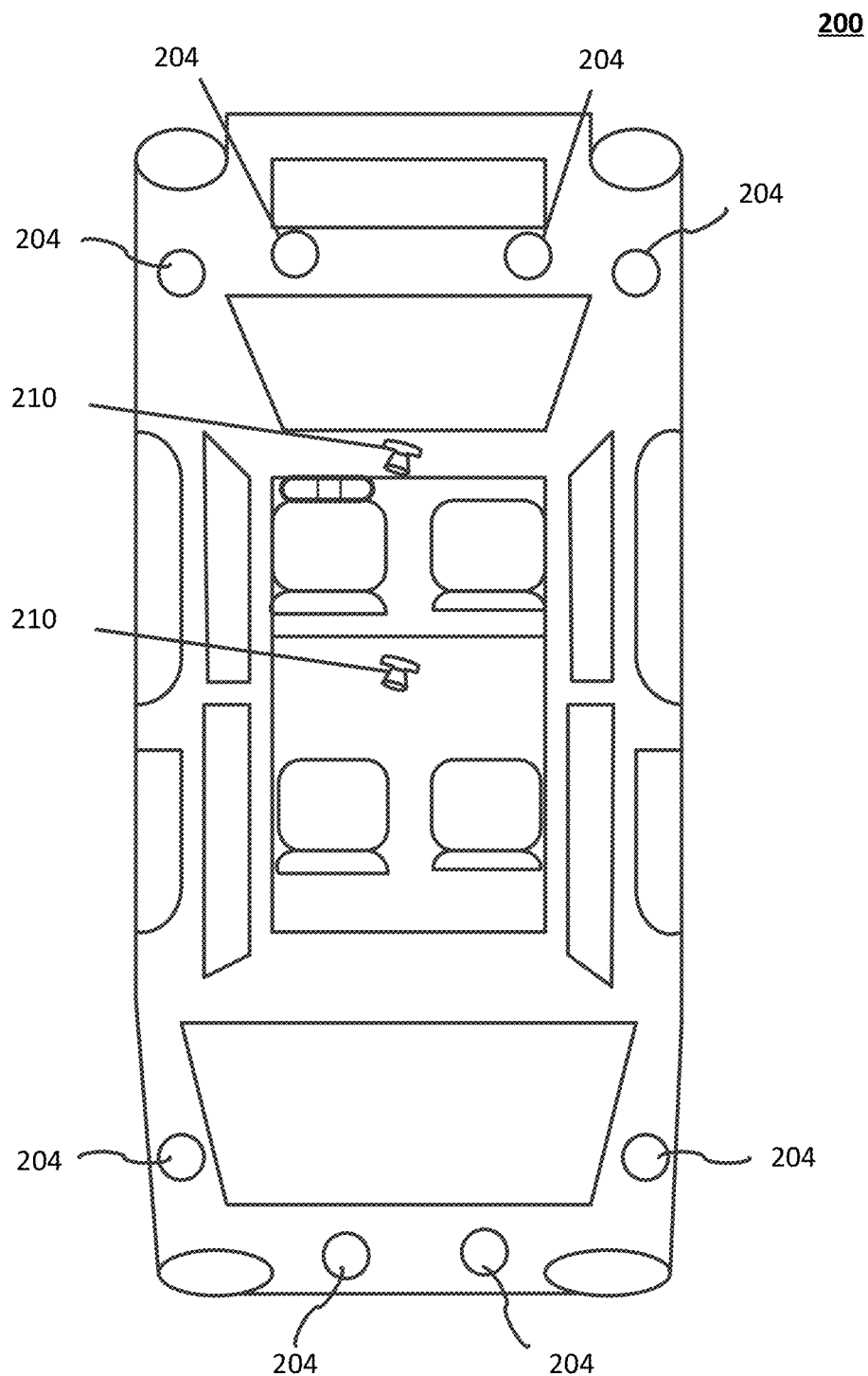
FIG. 2 illustrates a layout for a vehicle having multiple cameras.

FIG. 2 illustrates a layout in which multiple cameras are at different locations on a vehicle. A vehicle 200 is equipped with one or more outward facing video cameras 204. In some embodiments, a vehicle 200 includes one or more cabin video cameras 210. The cabin video cameras 210 are configured to monitor the driver and/or passenger's behavior. For example, for purposes of safety, the cabin video camera 210 may include a video controller that can monitor a driver's eye movement and/or head movement in order to determine the state of the driver, for example as being alert or tired.

In the case of a cabin video camera 210, video images may be obtained for different drivers at different time periods. There is a need to identify the person in the vehicle at different time periods. Also, the exterior cameras 204 may serve to identify a person in the vicinity of the vehicle as a person that may be entering the car.

In the case of a cabin video camera 210, the video camera 210 can detect a child being placed in the vehicle, in some cases being placed in a child safety seat. In some embodiments, the video camera 210 can identify the child in the vehicle and can be configured to transmit status information to a mobile device of a parent of the child.

Features of the disclosed invention are explained in terms of two desirable characteristics to be considered that are robust to appearance deformations (e.g., pose variations, occlusions) and background distractions occurring in the query person image. Ideal photos of a person of interest are not always available for use as a query person image. The best person image may be one in which the person is facing or moving away from a camera, or may be facing or moving sideways relative to a camera, not just facing directly into a camera. The camera may be positioned above or below a person such that the view direction is at an angle above or below a person's face. An image of a person may be a partial view of a person due to blockage by other objects, various lighting conditions, and/or shading conditions. A person image will typically include background. In addition to background scenery, background can include moving objects entering and passing through a scene, other people, a person or persons holding hands or performing gestures in the vicinity of the person of interest. A person image may include another person embracing the person of interest, such as giving a hug. Such background is preferably distinguished from the person of interest, but are distractions that make it difficult to determine clear boundaries.

Figure 3A:
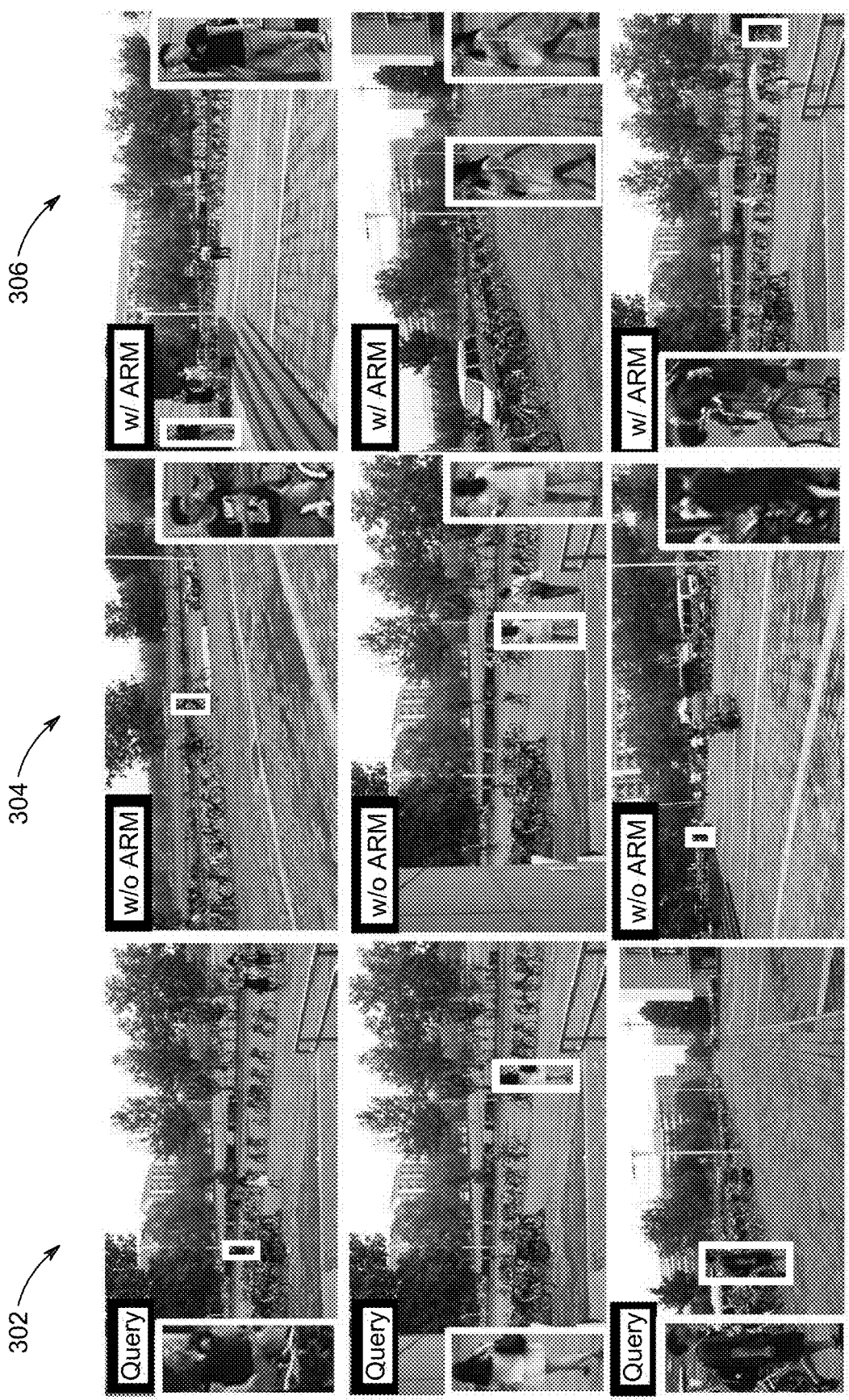
FIGS. 3A, 3B illustrate examples of appearance deformations and background distractions that degrade accuracy of a query person image.
Figure 3B:
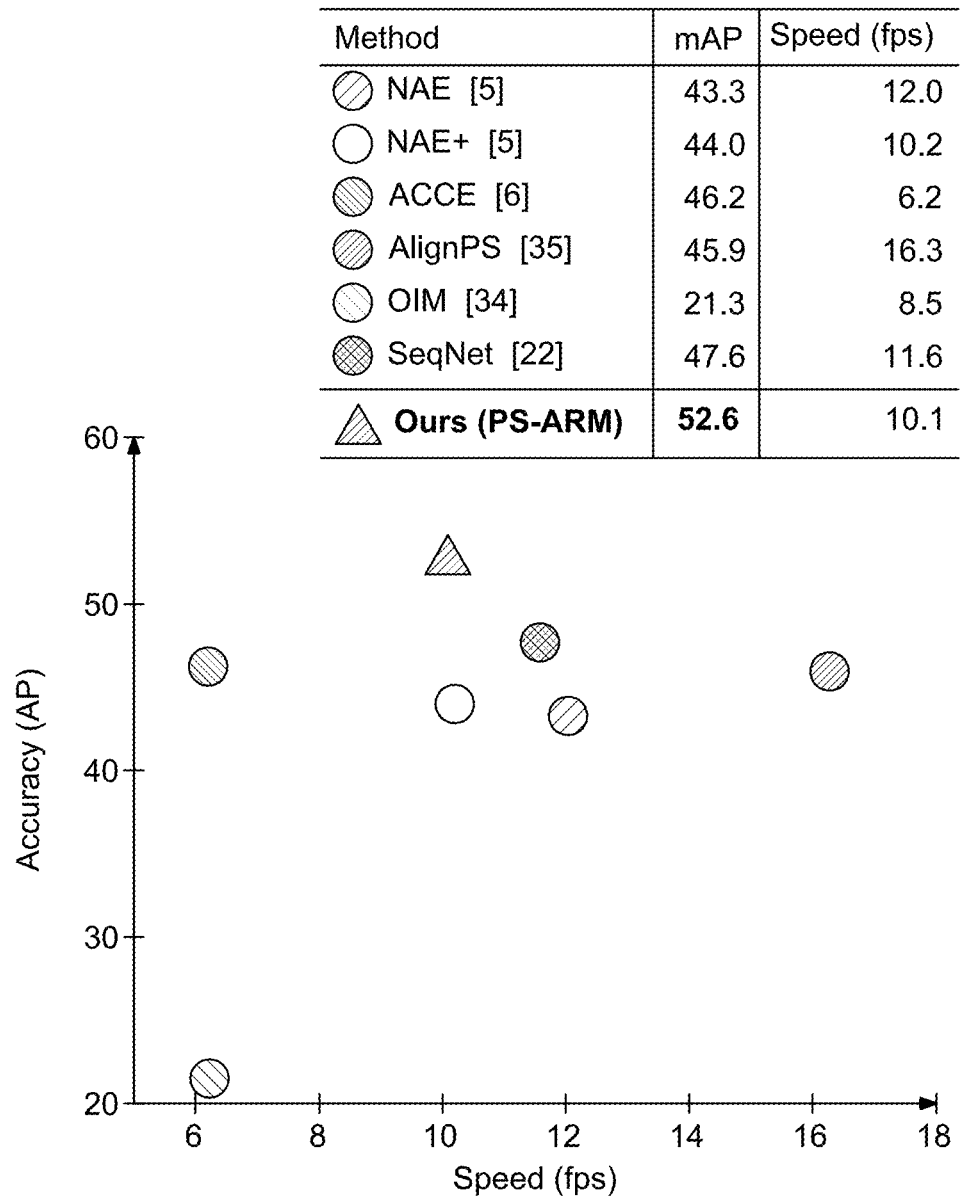

FIGS. 3A and 3B illustrate examples of appearance deformations and background distractions. FIG. 3A illustrates the qualitative comparison showing different non-limiting query examples 302 and their corresponding top matching results obtained with and without the ARM module in the same base framework. Here, false 304 and true 306 matching results are shown. These examples depict appearance deformations and distracting backgrounds in the gallery images for the query person 302. The query person image 302 in the second row is an image of a person moving away from the camera, i.e., a view of the back of the person. The query person image 302 in the third row is an image the side view of a person. In each case, a conventional person search resulted in false identification 304 for the query person image. The ARM module, in 306, explicitly captures discriminative relation features to better handle the appearance deformations in these examples.

FIG. 3B is a graph illustrating an accuracy (AP) vs. speed (frames per second) comparison with state-of-the-art person search methods based on the PRW test set (where PRW is an acronym for Person Re-identification in the Wild). All methods are reported based on a Resnet50 backbone. Speed is computed using a V100 GPU as the implementation platform. Referring to FIG. 3B, the PS-ARM achieves an absolute mAP gain of 5% over SeqNet while operating at a comparable speed.

Discriminative Relation Features through Local Information Mixing: As stated above, the position of different local person regions within an RoI can vary in case of appearance deformations such as pose variations and occlusions. These deformations can deteriorate the quality of re-id features, leading to inaccurate person matching. Therefore, a dedicated mechanism is desired that generates discriminative relation features by globally mixing relevant information from different local regions within an RoI. To ensure a straightforward integration into existing person search pipelines, such a mechanism is further expected to learn discriminative relation features without requiring fine-level region supervision or topological body approximations.

FG-BG Delineation for Accurate Local Information Mixing: The quality of the aforementioned relation features rely on the assumption that the RoI region only contains foreground (person) information. However, in real-world scenarios the RoI regions contain unwanted background information due to bounding-box locations. Therefore, foreground-background (fg-bg) delineation is essential for accurate local information mixing to obtain discriminative relation features. Further, such a fg-bg delineation can also improve the detection performance.

Overall Architecture

Figure 4:
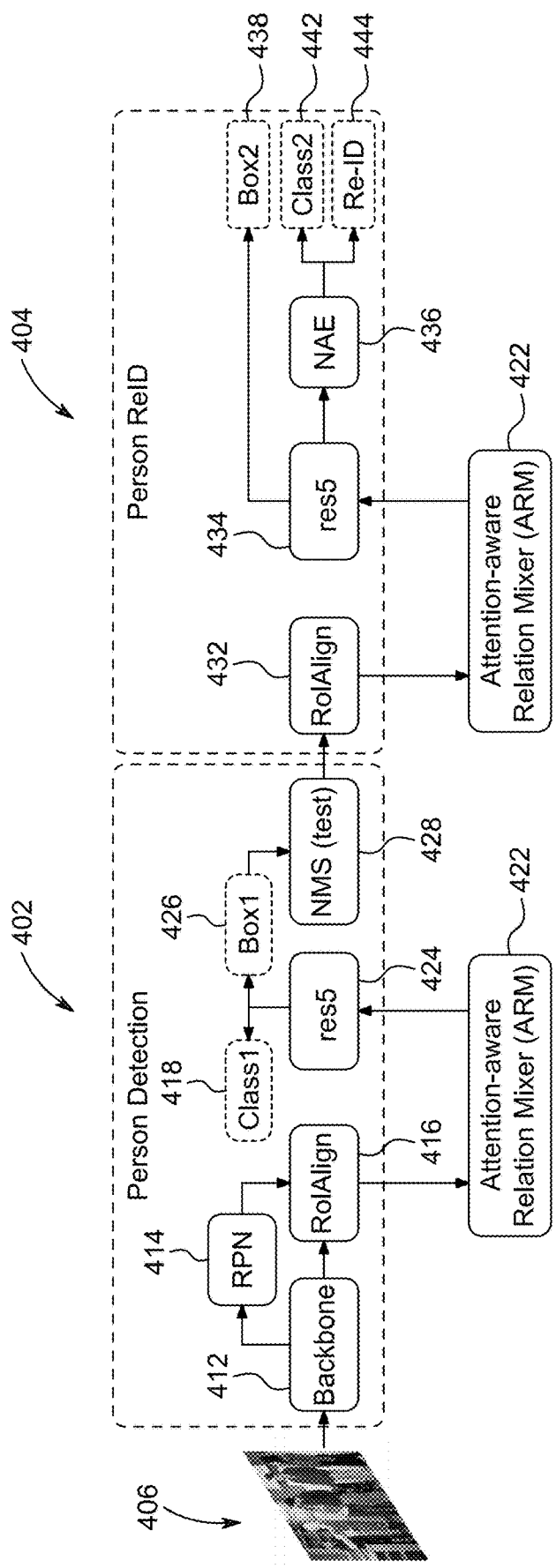
FIG. 4 is a block diagram of an overall architecture of the PS-ARM framework, in accordance with an exemplary aspect of the disclosure.

FIG. 4 is a block diagram of an overall architecture of the disclosed framework. It comprises a person detection branch 402 and a person re-id branch 404. The person detection branch 402 follows the structure of standard Faster R-CNN, which comprises a ResNet backbone (res1-res4), a region proposal network (RPN 414), RoIAlign pooling 416, and a prediction head for box regression and classification. The person re-id branch 404 takes the boxes predicted by the person detection branch 402 as input and performs RoIAlign pooling 432 on these predicted box locations. The resulting RoI Align pooled features are utilized to refine the box locations, along with generating a norm-aware embedding 436 for box classification (person vs. background) and re-id feature prediction. In both person detection 402 and person re-id 404 branches, the RoI Align 416, 432 features are passed through a non-shared convolution block (res5 424, 434) and pooling layers before being used for the predictions. During inference, the person re-id branch 404 takes only unique boxes (obtained by non-maximum suppression algorithm) from the person detection branch 402 and performs a context bipartite graph matching for the re-id similar to Li et al. See Li et al. (2021). The above-mentioned standard detection 402 and re-id 404 branches serve as a base network to which an attention-aware relation mixer (ARM 422) module are introduced that enriches the RoI features for accurate person search.

The focus of the design is the introduction of an ARM module. Specifically, the ARM module 422 is integrated between the RoIAlign 416, 432 and convolution blocks (res5 424, 434) in both the person detection 402 and re-id 404 branches of the base framework. The ARM module 422 strives to enrich standard RoI Align 416 pooled features by capturing discriminative relation features between different local regions within an RoI through global mixing of local information. To ensure effective enrichment of RoI Align pooled features, a FGBG delineation mechanism is introduced into the ARM module 422. The ARM module 422 strives to simultaneously improve both detection and re-id sub-tasks, and therefore utilizes non-shared parameters between the detection 402 and re-id 404 branches. Furthermore, the ARM module 422 is generic and can be easily integrated to other Faster R-CNN based person search methods. Next, are presented the details of the ARM module.

Attention-Aware Relation Mixer (ARM) Module

Figure 5:
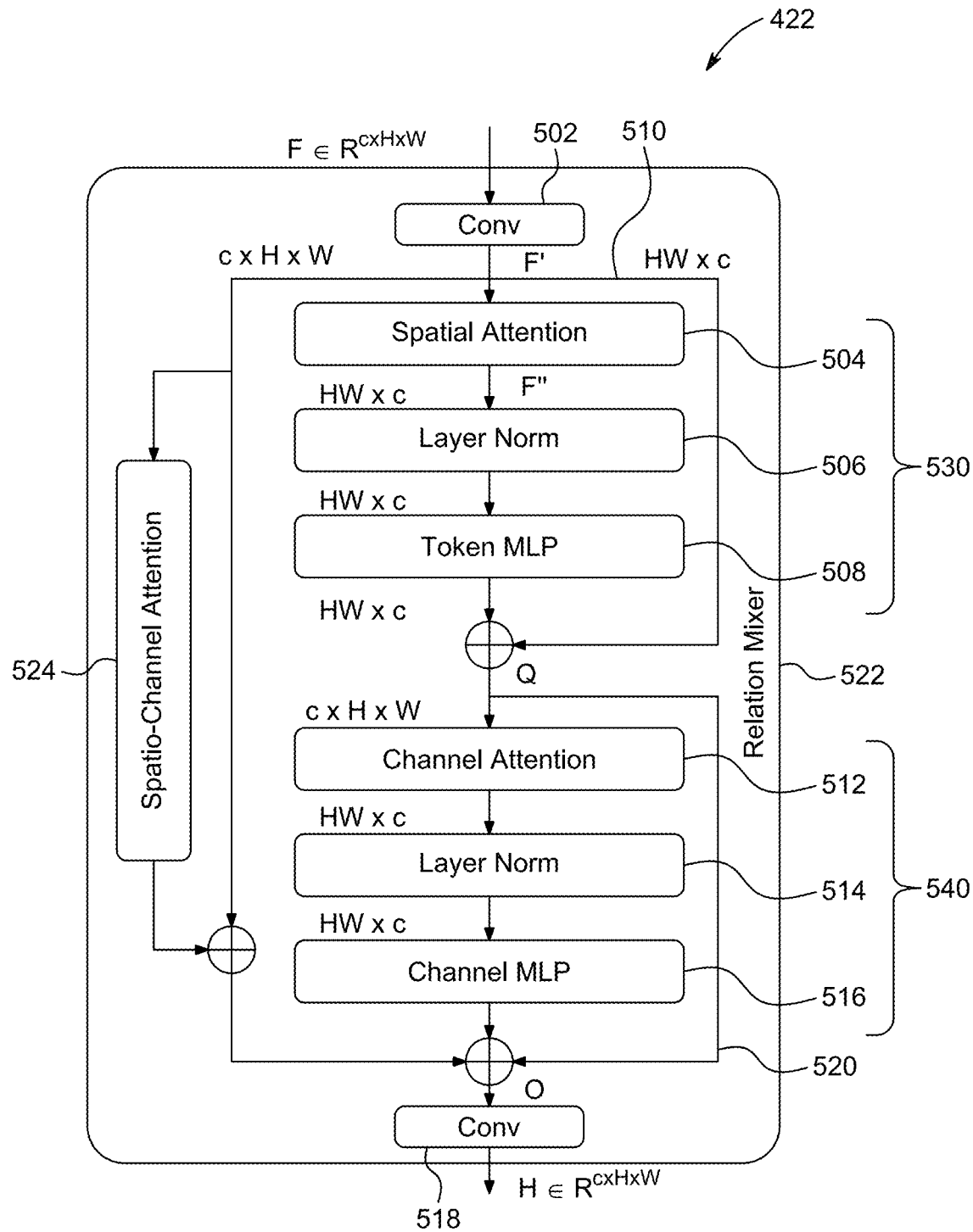
FIG. 5 is a block diagram of the ARM module, in accordance with an exemplary aspect of the disclosure.

FIG. 5 is a block diagram of the ARM module. The ARM module 422 takes RoI Align pooled features as input and captures inter-dependency between different local regions, while simultaneously suppressing background distractions for the person search problem. The ARM module 422 comprises a relation mixer block 522 and a spatio-channel attention layer 524. The relation mixer block 522 constitutes spatially attended token (spatial) mixing, feature (channel) attended channel mixing, and includes an input-output skip connection. The relation mixer block 522 generates discriminative relation features which are further enriched by suppressing the unwanted background features by the spatio-channel attention layer 524.

In particular, the relation mixer block 522 captures a relation between different sub-regions (local regions) within an RoI. The resulting features are further enriched by a spatio-channel attention layer 524 that attends to relevant input features in a joint spatio-channel space. The ARM module 422 takes RoIAlign pooled feature $\mathcal{F} \in \mathbb{R}^{C \times H \times W}$ as input. Here, H, W, C are the height, width and number of channels of the RoI feature. For computational efficiency, the number of channels are reduced to c=C/4 through a point (1×1) convolution layer 502 before passing to relation mixer 522 and spatio-channel attention 524 blocks.

Relation Mixer Block (522): As mentioned earlier, the relation mixer block 522 is introduced to capture the relation between different sub-regions (local regions) within an RoI. This is motivated by the fact that the local regions of a person share certain standard prior relationships among local regions, across RoIs of different persons and it is desirable to explicitly learn these inter-dependencies without any supervision. One such module that can learn/encode such inter-dependencies is a MLP-mixer that performs spatial token mixing followed by pointwise feature refinement. See Tolstikhin, I. O., Houlsby, N., Kolesnikov, A., Beyer, L., Zhai, X., Unterthiner, T., Yung, J., Steiner, A., Keysers, D., Uszkoreit, J., et al.: Mlp-mixer: An all-mlp architecture for vision. Advances in Neural Information Processing Systems 34 (2021), incorporated herein by reference in its entirety. The MLP mixer conceptually acts as a persistent relationship memory that can learn and encode the prior relationships among the local regions of an object at a global level. Despite this, it has been empirically observed that a straightforward integration of MLP mixer on the RoIAlign pooled features leads to sub-optimal results for the person search problem likely due to the diverse objectives of person detection 402 and re-id 404. To address this issue, a simple feature re-using strategy is introduced to the MLP mixer. The feature reusing strategy is motivated by DenseNet, which re-uses the input features of the MLP mixer at its output through a skip connection. See Huang, G., Liu, Z., Van Der Maaten, L., Weinberger, K. Q.: Densely connected convolutional networks. In: Proceedings of the IEEE conference on computer vision and pattern recognition. pp. 4700-4708 (2017), incorporated herein by reference in its entirety. This additionally introduced input-output skip connection along with the default skip connections within token and channel mixers provides complete feature re-use within the ARM module 422. The simple feature re-using strategy is not only enabled using the MLP mixer for the first time in the problem of person search, but also provides impressive performance gain over the base framework. To this end, the relation mixer 522 comprises a spatially attended spatial mixer 504 and a channel-wise attended channel mixer 512 along with an input-output skip connection 510, 520 for feature re-use.

Figure 6:
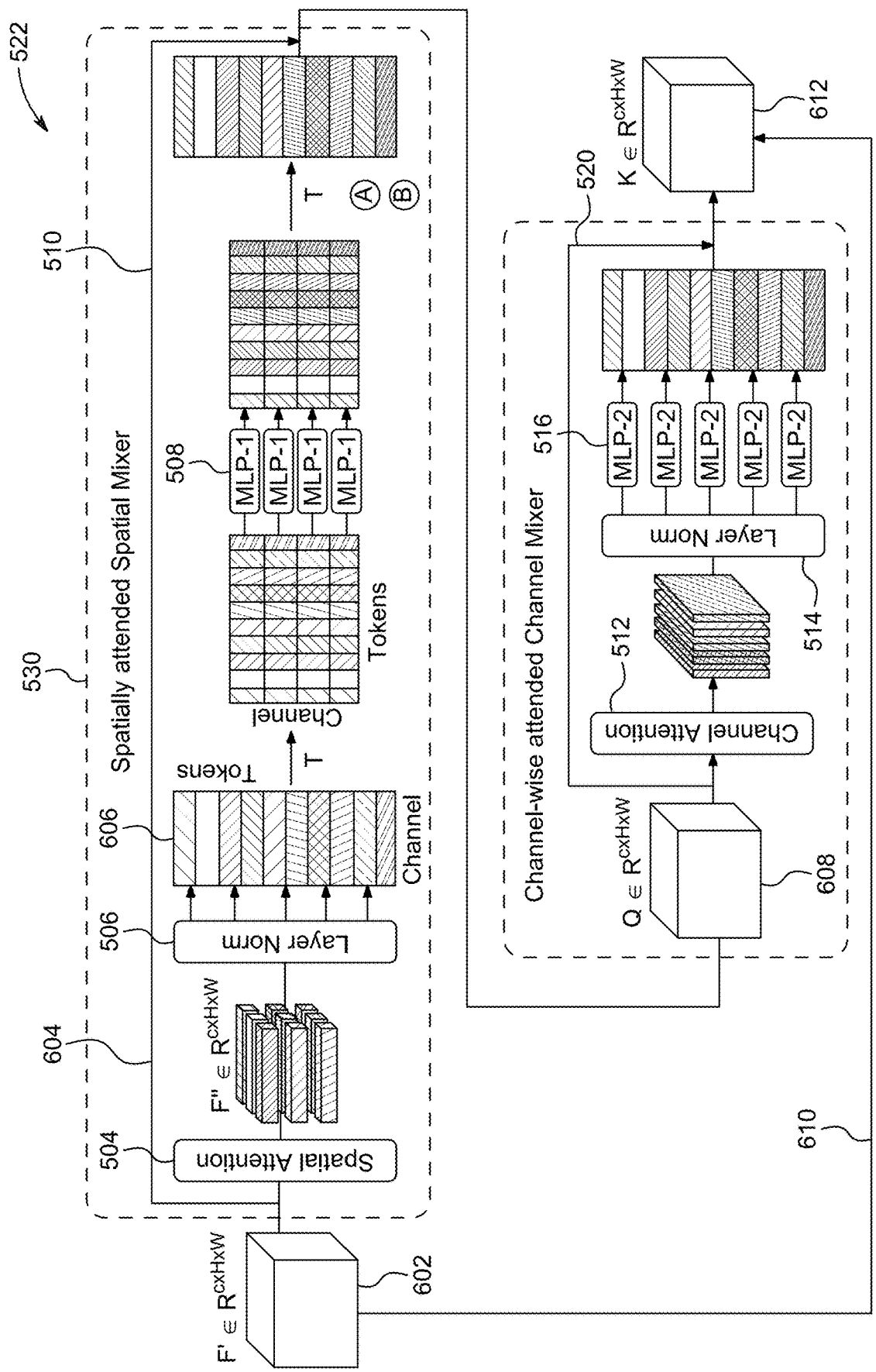
FIG. 6 is a block diagram of the relation mixer block within the ARM module, in accordance with an exemplary aspect of the disclosure.

FIG. 6 is a block diagram of the relation mixer block within the ARM module. The relation mixer block 522 comprises a spatially attended spatial mixing operation 530 where important local spatial regions are emphasized using a spatial attention before globally mixing them across all spatial regions (tokens) within each channel using MLP-1 shared across all channels. Following this spatial mixing, a channel attention 540 is performed to emphasize informative channels before globally mixing the channels for each local spatial region (token) using MLP-2 shared across all spatial regions. Additionally, feature re-using is performed within the relation mixer using an input-output skip connection, to simultaneously handle diverse detection and re-id objectives of person search problem.

Spatially attended Spatial Mixer (530): While learning the inter-dependencies of local RoI sub-regions using standard MLP mixer, the background regions are likely to get entangled with the foreground regions, thereby adversely affecting the resulting feature embedding used for the re-id and box predictions. In order to disentangle the irrelevant background information, a spatial attention 504 is introduced before performing token (spatial) mixing within the MLP mixer for emphasizing the foreground regions. In the spatial attention 504, pooling operations are employed along the channel axis 602, followed by convolution and sigmoid layers to generate a 2D spatial attention weights $M_s \in \mathbb{R}^{1 \times H \times W}$. These attention weights are broadcasted along the channel dimension to generate the spatial attention $M'_s \in \mathbb{R}^{C \times H \times W}$. For a given feature $\mathcal{F}' \in \mathbb{R}^{C \times H \times W}$ 602, the spatially attended feature map $\mathcal{F}'' = \mathcal{F}' \odot M'_s$ 604 is obtained. Here $\odot$ denotes element-wise multiplication. These spatially attended features ($\mathcal{F}''$) 604 disentangle irrelevant (background) spatial regions from the foreground. These features are ($\mathcal{F}''$) 604 input to a shared multi-layer perceptron 508 (MLP-1) for globally mixing local features (within $\mathcal{F}''$) 604 across all spatial regions (tokens). The spatially attended spatial mixing strives to achieve accurate spatial mixing and outputs the feature map Q 608.

Channel-wise attended Channel Mixer (540): To further prioritize the feature channels of Q 608 that are relevant for detection and re-id of person instances, a channel attention 512 is introduced before channel mixing. The channel attention weights $M_c \in \mathbb{R}^{c \times \times 1}$ are generated through spatial pooling, fully connected (fc) and sigmoid layers, which are broadcasted along the spatial dimension to generate the channel attention weights $M'_c \in \mathbb{R}^{c \times H \times W}$. Similar to spatial attention, these channel weights are element-wise multiplied with the feature map to obtain channel-wise attended featuremap. The resulting features emphasize only the channels that are relevant for effective channel-mixing within the relation mixing block. The channel mixing 540 employs another shared MLP (MLP-2) 516 for global mixing of channel information. As mentioned earlier, the resulting mixed features are further refined through a skip connection 610 from $\mathcal{F}'$ 602 (feature re-using), producing output feature $K \in \mathbb{R}^{c \times H \times W}$ 612 from the relation mixer 522.

Spatio-channel Attention Layer (524): The relation mixer block 522 performs the mixing operations by treating the spatial and channel information in a disjoint manner. But, in many scenarios, all spatial regions within a channel and all channels at a given spatial location are not equally informative. Hence, it is desired to treat the entire spatio-channel information as a joint space. With this objective, a joint spatio-channel attention layer 524 is introduced within the ARM module 422 to further improve foreground-background (FG-BG) delineation of RoIAlign pooled features. The spatio-channel attention layer 524 utilizes parameter-free 3D attention weights obtained based on Yang et al. to modulate the 3D spatio-channel RoI pooled features. See Yang, L., Zhang, R. Y., Li, L., Xie, X.: Simam: A simple, parameter-free attention module for convolutional neural networks. In: International Conference on Machine Learning. pp. 11863-11874. PMLR (2021), incorporated herein by reference in its entirety. These spatio-channel attended features are aggregated with the relation mixer output to produce enriched features O for the person search task. These enriched features are projected back to C channels ($\mathcal{H} \in \mathbb{R}^{C \times H \times W}$) and taken as input to the res5 block 434.

In summary, within the ARM module 422, the relation mixer 522 targets FG-BG delineation and capturing of discriminative relation features in disjoint spatial and channel spaces. The resulting features are further enriched by a spatio-channel attentv cion 524 that performs FG-BG delineation in a joint spatio-channel space.

Training and Inference

For training and inference, the PS-ARM is trained end-to-end with a loss formulation. That is, the person detection branch 402 is based on Faster R-CNN such that Smooth-L1 and cross entropy losses are employed for box regression and classifications. For the person re-id branch 404, three additional loss terms are employed for regression, classification and re-ID. Both these branches are trained by utilizing an IoU threshold of 0.5 for selecting positive and negative samples.

During inference, the re-id feature is first obtained for a given query by using the provided bounding box. Then, for the gallery images, the predicted boxes and their re-id features are obtained from the re-id branch 404. Finally, cosine similarity is employed between the re-id features to match a query person with an arbitrarily detected person in the galley.

EXAMPLES

For purposes of comparison with other state-of-the art methods, experiments are performed on two person search datasets (i.e., CUHK-SYSU) and PRW. See Xiao et al. (2017) and Zheng et al. (2017).

Dataset and Evaluation Protocols

CUHK-SYSU: is a large scale person search dataset with 96,143 person bounding boxes from a total of 18,184 images. See Xiao et al. (2017). The training and testing sets contains 11,206 images, 55,272 pedestrians, and 5,532 identities and test set includes 6,978 images, 40,871 pedestrians, and 2,900 identities. Instead of using full gallery during inference, different gallery sizes are used for each query from 50 to 4000. The default gallery size is set to 100.

PRW: is composed of video frames recorded by six cameras that are installed at different location in Tsinghua University. See Zheng et al. (2017). The dataset has a total 11,816 frames containing 43,110 person bounding boxes. In training set, 5,704 images are annotated with 482 identities. The test set has 2,057 frames are labelled as query persons while gallery set has 6,112 images. Hence, the gallery size of PRW dataset is notably larger compared to CUHK-SYSU gallery set.

Evaluation Protocol: Two standard protocols for person search are followed for performance evaluation of mean Average Precision (mAP) and top-1 accuracy. The mAP is computed by averaging over all queries with an intersectionover-union (IoU) threshold of 0.5. The top-1 accuracy is measured according to the IoU overlaps between the top-1 prediction and ground-truth with the threshold value set to 0.5.

Implementation Details: ResNet-50 was used, pretrained over ImageNet, as a backbone network. See He, K., Zhang, X., Ren, S., Sun, J.: Deep residual learning for image recognition. In: Proceedings of the IEEE conference on computer vision and pattern recognition. pp. 770-778 (2016); and Deng, J., Dong, W., Socher, R., Li, L. J., Li, K., Fei-Fei, L.: Imagenet: A large-scale hierarchical image database. In: 2009 IEEE conference on computer vision and pattern recognition. pp. 248-255. IEEE (2009), each incorporated herein by reference in their entirety. Li et al. (2021) was followed and utilized Stochastic Gradient Descent (SGD), set momentum and decay to 0.9 and $5\times10^{-4}$, respectively. The model for 12 epochs are trained over CUHK-SYSU dataset and 10 epochs over PRW dataset. During training, the batch-size of 5 was used with input size 900×1500 and set initial learning rate to 0.003 which is warmed up at first epoch and decayed by 0.1 at 8th epoch. During inference, the NMS threshold value is set to 0.4. The code is implemented in PyTorch. See Paszke, A., Gross, S., Massa, F., Lerer, A., Bradbury, J Chanan, G., Killeen, T., Lin, Z., Gimelshein, N., Antiga, L., et al.: Pytorch: An imperative style, high-performance deep learning library. Advances in neural information processing systems 32 (2019), incorporated herein by reference in its entirety.

Comparison with State-of-the-Art Methods

The presently disclosed approach is compared with state-of-the-art one-step and two-step person search methods on two datasets: CUSK-SYSU and PRW. CUHK-SYSU Comparison: Table 1 shows the comparison of the PS-ARM with state-of-the-art two-step and single-step end-to-end methods with the gallery size of 100. Among existing two-step methods, MGN+OR and TCTS achieves mAP of 93.2 and 93.9, respectively. See Yao, H., Xu, C.: Joint person objectness and repulsion for person search. IEEE Transactions on Image Processing 30, 685-696 (2020); and Wang et al. (2020), each incorporated herein by reference in their entirety. Among existing single-step end-to-end methods, SeqNet and AlignPS obtains mAP of 94.8%, 93.1% respectively. See Li et al. (2021); and Yan, Y., Li, J., Qin, J., Bai, S., Liao, S., Liu, L., Zhu, F., Shao, L.: Anchor-free person search. In: Proceedings of the IEEE/CVF Conference on Computer Vision and Pattern Recognition. pp. 7690-7699 (2021), each incorporated herein by reference in their entirety.

To further analyze the benefits of the ARM module, the ARM module is inserted into a Faster R-CNN based method (NAE method) after RoIAlign pooling. See Chen et al. (2020). The ARM module can provide an absolute gain of 1.9% and 1.8% to the mAP and top-1 accuracies over NAE (see Table 1). The PS-ARM outperforms all existing methods, and achieves a mAP score of 95.2. In terms of top-1 accuracy the method sets a state-of-the-art accuracy of 96.1%.

Figure 7:
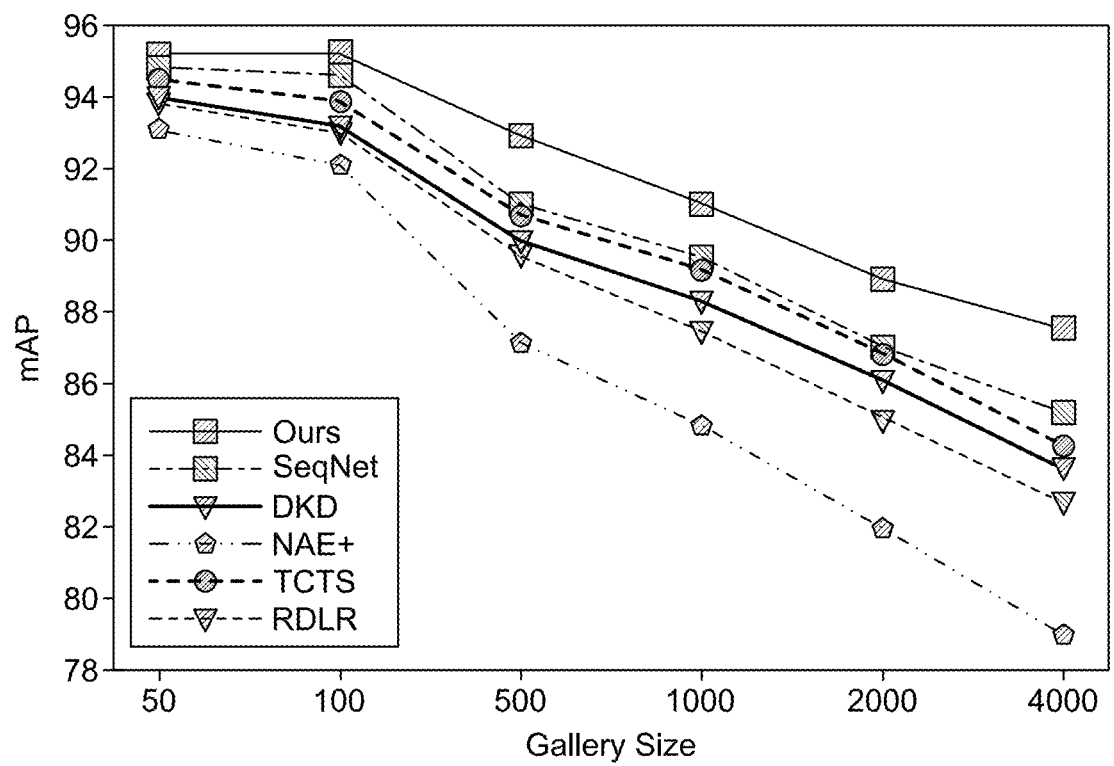
FIG. 7 is a graph illustrating the state-of-the-art comparison of existing methods over CUHK-SYSU dataset with varying gallery sizes.

CUHK-SYSU dataset has different range of gallery sizes such as 50, 100, 500, 1000, 2000, and 4000. To further analyze the disclosed method, an experiment was performed by varying the gallery size. The mAP scores across different gallery size are compared with recent one-stage and two-stage methods as shown in FIG. 7. FIG. 7 is a graph illustrating the state-of-the-art comparison of conventional methods over the CUHK-SYSU dataset with varying gallery sizes. Dotted lines represent two-stage methods whereas solid lines represent one-stage methods. The PS-ARM shows consistent improvement compared to other methods as the size of gallery increases.

PRW Comparison: Table 1 shows the state-of-the-art comparison on PRW dataset. Among the existing two stage methods, MGN+OR achieves the best mAP score 52.3, but with a very low top-1 accuracy. See Yao et al. (2020). While comparing the top-1 accuracy, TCTS provides the best performance, but with a very low mAP score. See Wang et al. (2020). To summarize, the performance of most two-step methods are inferior either in mAP score or top-1 accuracy. See Yao et al. (2020); Chen et al. (2018); Han et al. (2019); Girshick, R., Iandola, F., Darrell, T., Malik, J.: Deformable part models are convolutional neural networks. In: Proceedings of the IEEE conference on Computer Vision and Pattern Recognition. pp. 437-446 (2015); Dong et al. (2020); and Lan et al. (2018), each incorporated herein by reference in their entirety.

Among one-stage methods, NAE and AlignPS, achieved mAP scores of 43.3% and 45.9%. See Chen et al. (2020) and Yan et al. (2021). These methods achieved top-1 accuracies of 80.9% and 81.9%. Among the other one-step methods SeqNet, PBNet, DMRN, and DKD also performed well and obtained more than 46% mAP and have more than 86% top-1 accuracy. See Li et al. (2021); Tian, K., Huang, H., Ye, Y., Li, S., Lin, J., Huang, G.: End-to-end thorough body perception for person search. In: Proceedings of the AAAI Conference on Artificial Intelligence. vol. 34, pp. 12079-12086 (2020); Han, C., Zheng, Z., Gao, C., Sang, N., Yang, Y.: Decoupled and memory-reinforced networks: Towards effective feature learning for one-step person search. arXiv preprint arXiv:2102.10795 (2021); and Zhang, X., Wang, X., Bian, J. W., Shen, C., You, M.: Diverse knowledge distillation for end-to-end person search. In: Proceedings of the AAAI Conference on Artificial Intelligence. vol. 35, pp. 3412-3420 (2021), each incorporated herein by reference in their entirety.

TABLE 1

State-of-the-art comparison on CUHK and PRW test sets in terms of mAP and top-1 accuracy. On both datasets, the PS-ARM performs favorably against existing approaches. All the methods here utilize the same ResNet50 backbone. When compared with recently introduced SeqNet, the PS – ARM provides an absolute mAP gain of 5% on the challenging PRW dataset. Also, introducing the novel ARM module to a popular Faster R-CNN based approach (NAE), provides an absolute mAP gain of 3.6%. See Chen et al. (2020).

|  |  | CUHK-SYSU | | PRW | |
| --- | --- | --- | --- | --- | --- |
| Method |  | mAP | top-1 | mAP | top-1 |
| Two-step | CLSA | 87.2 | 88.5 | 38.7 | 65.0 |
|  | IGPN | 90.3 | 91.4 | 12.9 | 70.2 |
|  | DPM | — | — | 20.5 | 48.3 |
|  | RDLR | 93.0 | 94.2 | 42.9 | 70.2 |
|  | MGTS | 83.0 | 83.7 | 32.6 | 72.1 |
|  | MGN + OR | 93.2 | 93.8 | 52.3 | 71.5 |
|  | TCTS | 93.9 | 95.1 | 46.8 | 87.5 |
| End-to-end | OIM | 75.5 | 78.7 | 21.3 | 49.9 |
|  | RCAA | 79.3 | 81.3 | — | — |
|  | NPSM | 77.9 | 81.2 | 24.2 | 53.1 |
|  | IAN | 76.3 | 80.1 | 23.0 | 61.9 |
|  | QEEPS | 88.9 | 89.1 | 37.1 | 76.7 |
|  | CTXGraph | 84.1 | 86.5 | 33.4 | 73.6 |
|  | HOIM | 89.7 | 90.8 | 39.8 | 80.4 |
|  | BINet | 90.0 | 90.7 | 45.3 | 81.7 |
|  | AlignPS | 93.1 | 96.0 | 45.9 | 81.9 |
|  | PGA | 92.3 | 94.7 | 44.2 | 85.2 |
|  | DKD | 93.1 | 94.2 | 50.5 | 87.1 |
|  | NAE+ | 92.1 | 94.7 | 44.0 | 81.1 |
|  | PBNet | 90.5 | 88.4 | 48.5 | 87.9 |
|  | DIOIM | 88.7 | 89.6 | 36.0 | 76.1 |

TABLE 1-continued

State-of-the-art comparison on CUHK and PRW test sets in terms of mAP and top-1 accuracy. On both datasets, the PS-ARM performs favorably against existing approaches. All the methods here utilize the same ResNet50 backbone. When compared with recently introduced SeqNet, the PS – ARM provides an absolute mAP gain of 5% on the challenging PRW dataset. Also, introducing the novel ARM module to a popular Faster R-CNN based approach (NAE), provides an absolute mAP gain of 3.6%. See Chen et al. (2020).

|  | CUHK-SYSU | | PRW | |
|---|---|---|---|---|
| Method | mAP | top-1 | mAP | top-1 |
| APNet | 88.9 | 89.3 | 41.2 | 81.4 |
| DMRN | 93.2 | 94.2 | 46.9 | 83.3 |
| PGSFL | 90.2 | 91.8 | 42.5 | 83.5 |
| CAUCPS | 81.1 | 83.2 | 41.7 | 86.0 |
| ACCE | 93.9 | 94.7 | 46.2 | 86.1 |
| NAE | 91.5 | 92.4 | 43.3 | 80.9 |
| SeqNet | 94.8 | 95.7 | 47.6 | 87.6 |
| Ours (NAE + ARM) | 93.4 | 94.2 | 46.9 | 81.4 |
| Ours (PS – ARM) | 95.2 | 96.1 | 52.6 | 88.1 |

See Lan et al. (2018); Dong et al. (2020); Girshick et al. (2015); Han et al. (2019); Chen et al. (2018); Yao et al. (2020); Wang et al. (2020); Ziao et al. (2017); Chang et al. (2018); Liu et al. (2017); Xiao et al. (2019); Munjal et al. (2019); Yan et al. (2019); Chen et al. (2020); Dong et al. (2020); Yan et al. (2021); Kim, H., Joung, S., Kim, I. J., Sohn, K.: Prototype-guided saliency feature learning for person search. In: Proceedings of the IEEE/CVF Conference on Computer Vision and Pattern Recognition. pp. 4865-4874 (2021); Zhang et al. (2021); Chen et al. (2020); Tian et al. (2020); Dai, J., Zhang, P., Lu, H., Wang, H.: Dynamic imposter based online instance matching for person search. Pattern Recognition 100, 107120 (2020); Zhong, Y., Wang, X., Zhang, S.: Robust partial matching for person search in the wild. In: Proceedings of the IEEE/CVF Conference on Computer Vision and Pattern Recognition. pp. 6827-6835 (2020); Han et al. (2021); Kim et al. (2021); Han, B. J., Ko, K., Sim, J. Y.: Context-aware unsupervised clustering for person search. arXiv preprint arXiv:2110.01341 (2021); Chen, S., Zhuang, Y., Li, B.: Learning context-aware embedding for person search. arXiv preprint arXiv:2111.14316 (2021); Chen et al. (2020); and Li et al. (2021), each incorporated herein by reference in their entirety.

To further analyze the effectiveness of the ARM module, the ARM module was integrated to NAE and achieved absolute mAP gain of 3.6% mAP, leading to an mAP score of 46.9%. A similar performance gain was observed over top-1 accuracy, resulting in top-1 score of 81.4%. The ARM module was integrated in Han's method. See Han et al. (2021). Compared to the existing methods, Han et al. utilize a different approach, such as an RoI pooling of 24×8 size, instead of 14×14. To this end, PS-ARM was modified to adapt the setting of Han et al., resulting in absolute gains of 2% and 1.3% improvement on PRW dataset and obtained 55.3% mAP and 89.0% top-1 scores, respectively. The PS-ARM achieved state-of-the-art performance compared the existing one-step and two-step methods. A mAP score of 52.6% and top-1 score of 88.1% was achieved.

TABLE 2

Ablation study over the PRW dataset by incrementally adding the novel contributions to the baseline. While introducing a standard MLP mixer to a baseline, both the detection and re-id performance reduces over the baseline. The feature re-using strategy helped to improve the performance over the MLP mixer. The integration of spatially attended spatial mixing and channel-wise attended channel mixing within the relation mixer captures discriminative relation features within RoI while suppressing distracting background features, hence provides superior re-id performance. Finally, the joint spatio-channel attention removes distracting backgrounds in a joint spatio-channel space, leading to improved detection and re-id performance.

|  | ReID | | Detection | |
|---|---|---|---|---|
| Method | mAP | top-1 | Recall | AP |
| Baseline | 47.6 | 87.6 | 96.3 | 93.1 |
| Baseline + Standard MLP-Mixer | 45.3 | 85.6 | 95.7 | 92.8 |
| Baseline + Standard MLP-Mixer + Feature Re-use | 49.1 | 86.8 | 96.3 | 93.3 |
| Baseline + Relation Mixer | 51.8 | 87.9 | 96.6 | 93.8 |
| PS – ARM (Baseline + ARM) | 52.6 | 88.1 | 97.4 | 94.1 |

Figure 8:
FIG. 8 illustrates the qualitative comparison between the top-1 results obtained from SeqNet (row 2) and the PS-ARM (row3) for the same query input (row 1)

Qualitative comparison: FIG. 8 illustrates qualitative comparison between the SeqNet (row 2) and the PS-ARM for the same query input (row 1). See Li et al. (2021). Here, true and false matching results are marked in green and red, respectively. The figure shows top-1 results obtained from both methods. It can be observed that SeqNet provides inaccurate top-1 predictions due to the appearance deformations. The PS-ARM provides accurate predictions on these challenging examples by explicitly capturing discriminative relation features within RoI.

Figure 9:
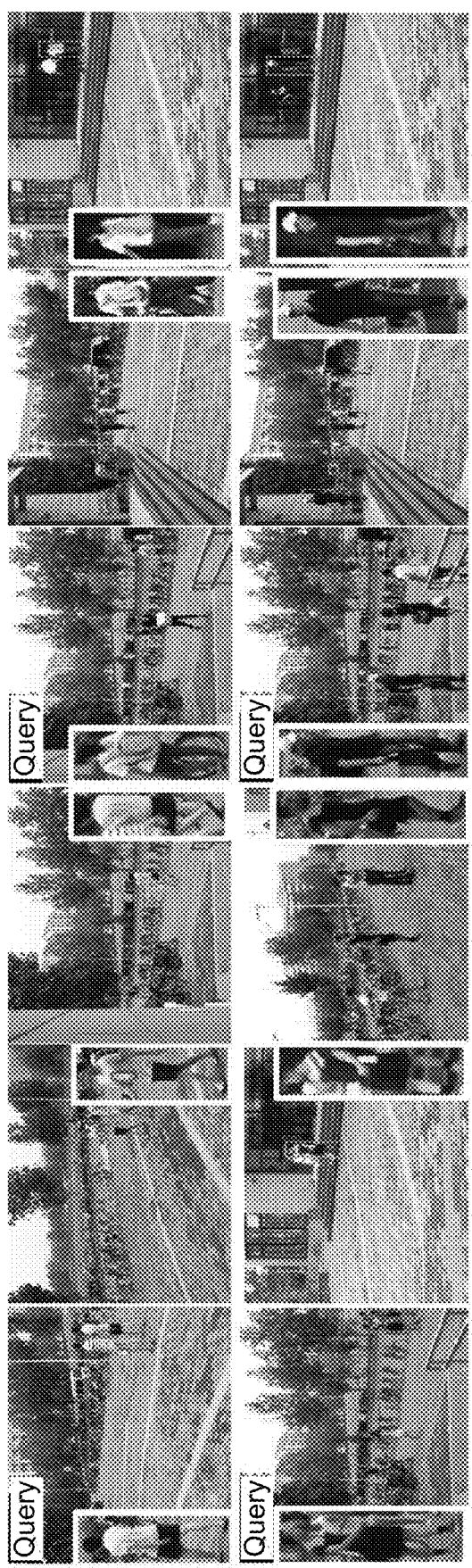
FIG. 9 illustrates the qualitative results of the PS-ARM applied to the PRW dataset.

FIG. 9 illustrates the qualitative results from the PS-ARM. Here the top-2 matching results are shown for each query image. It can be seen that the PS-ARM can accurately detect and re-identify the query person in both gallery images.

Ablation Study

An ablation study was performed on the PRW dataset. Table 2 shows the performance gain obtained by progressively integrating the novel contributions to the baseline. It can be seen that a straightforward integration of a standard MLP mixer on the RoIAlign pooled feature leads to inferior detection and re-id performance. The detection and re-id performance reduces over the baseline from 93.1 to 92.8 AP and 47.6 to 45.3 mAP, respectively. It can be observed that a simple skip connection based feature re-use helped to improve the performance over the MLP mixer by achieving 93.1 detection AP and re-id 49.1 mAP score. With the introduction of spatially-attended spatial mixing and channel-wise attended channel mixing within the relation mixer captures discriminative relation features within RoI while suppressing distracting background features. This resulted in superior re-id performance. Introducing the relation mixer comprising of a spatially attended spatial mixing, channel-wise attended channel mixing and an input-output skip connection leads to an overall AP of 93.8 for detection and 51.8 mAP for re-id. To further complement the relation mixer that performs information mixing in the disjoint spatial and channel spaces, a joint spatio channel attention is introduced. The joint spatio-channel attention removes distracting backgrounds in a joint spatio-channel space, leading to improved detection and re-id performance by achieving 94.1 and 52.6, respectively.

Figure 10:
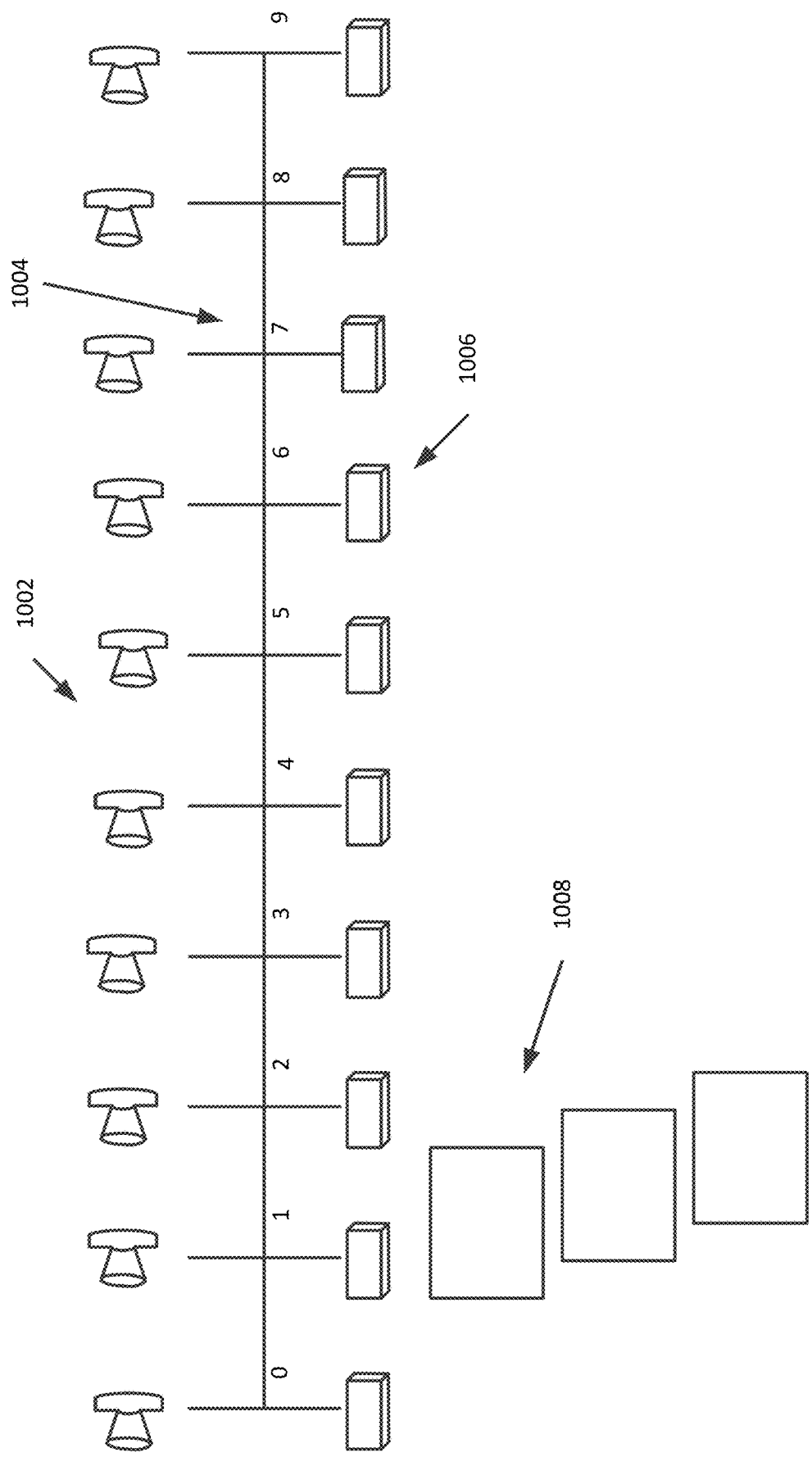
FIG. 10 illustrates a non-limiting display for an output resulting from the PS-ARM, in accordance with an exemplary aspect of the disclosure.

FIG. 10 illustrates a non-limiting display for an output resulting from the PS-ARM. In an embodiment, the output from PS-ARM may be used to review images for a person search. The display is configured to show a timeline of cameras 1002 that captured images 1006 of a person search. In cases where the timeline contains multiple images for a camera 1002 at a point along the timeline 1004, the time point can be expanded to show individual images 1008. Each image contains a person image corresponding to the person in the person query. The timeline may be scrolled to display sections of the timeline that extend beyond the display boundaries.

In an embodiment, each icon for a camera 1002 can further display information about the camera, including the camera properties such as resolution, make and model, and the location of the camera including building address, room identification, location in the room. A summary of information about the camera can be displayed by hovering over the camera icon, or by clicking on the camera icon to bring up a text box displaying full or scrollable information about the camera. Icons for images 1006 may display overlapping thumbnail images. Expansion of the thumbnail images may be accomplished by dragging the top image of a group of overlapping images.

The purpose of the timeline 1004 and arrangement of cameras 1002 along the timeline is to trace movement of a person that is in the search query. Each camera 1002 represents a camera that captured an image containing the person at a particular time point in the timeline 1004.

Figure 11:
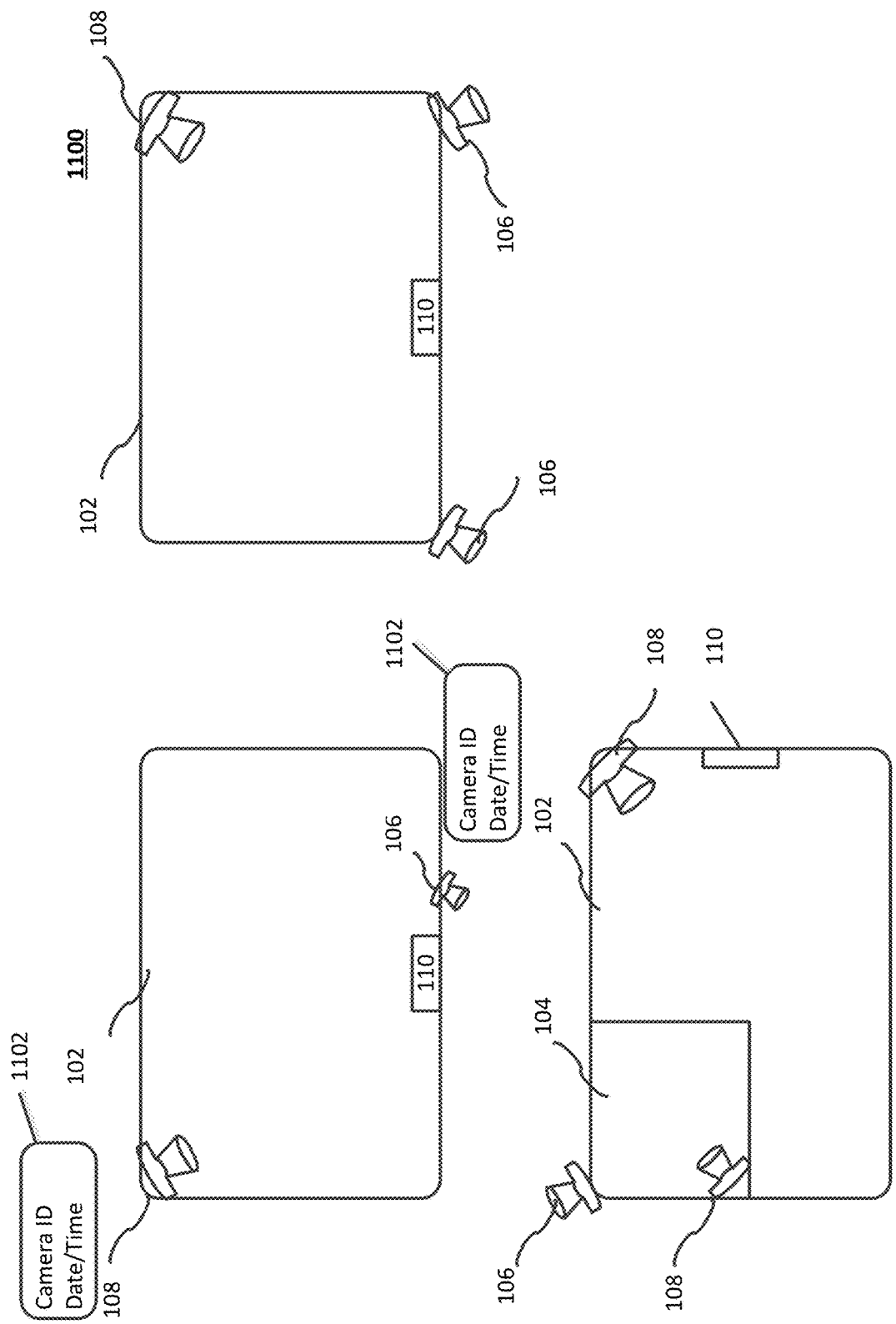
FIG. 11 illustrates a non-limiting display for an output resulting from the PS-ARM, in accordance with an exemplary aspect of the disclosure.

FIG. 11 illustrates a non-limiting display for an output resulting from the PS-ARM. In an embodiment, the output from PS-ARM may be incorporated into a display of an area containing video surveillance cameras 106, 108. The display may be a real time display for a query person as they are detected by one or more of the cameras 106, 108. The area may be rooms in a building, of several buildings. The display 1100 may show text information associated with cameras, for example as pop-up balloons. The text information may include a camera ID and data/time period when the searched person image was detected by that particular camera. The display 1100 may display indications of a sequence of cameras that detected the person images, for example, by displaying a number or alphabetical ordered letter in association with the cameras.

In an embodiment, the display 1100 is for multiple query person images. The display 1100 may include a section for submitting multiple query person images. Search results for each query person image may be indicated by a distinct identifier, such as a number or letter displayed in a box or circle, or the searched person's name or initials, or other way of quickly identifying a searched person image in the display 1100.

In one embodiment, the cameras in the display may cycle through a display sequence of cameras lighting up to show the time order that the cameras identified a person image based on the person query. In one embodiment, the time order that cameras identified a person image may be used to display an estimated path of the person associated with the query person.

Figure 12:
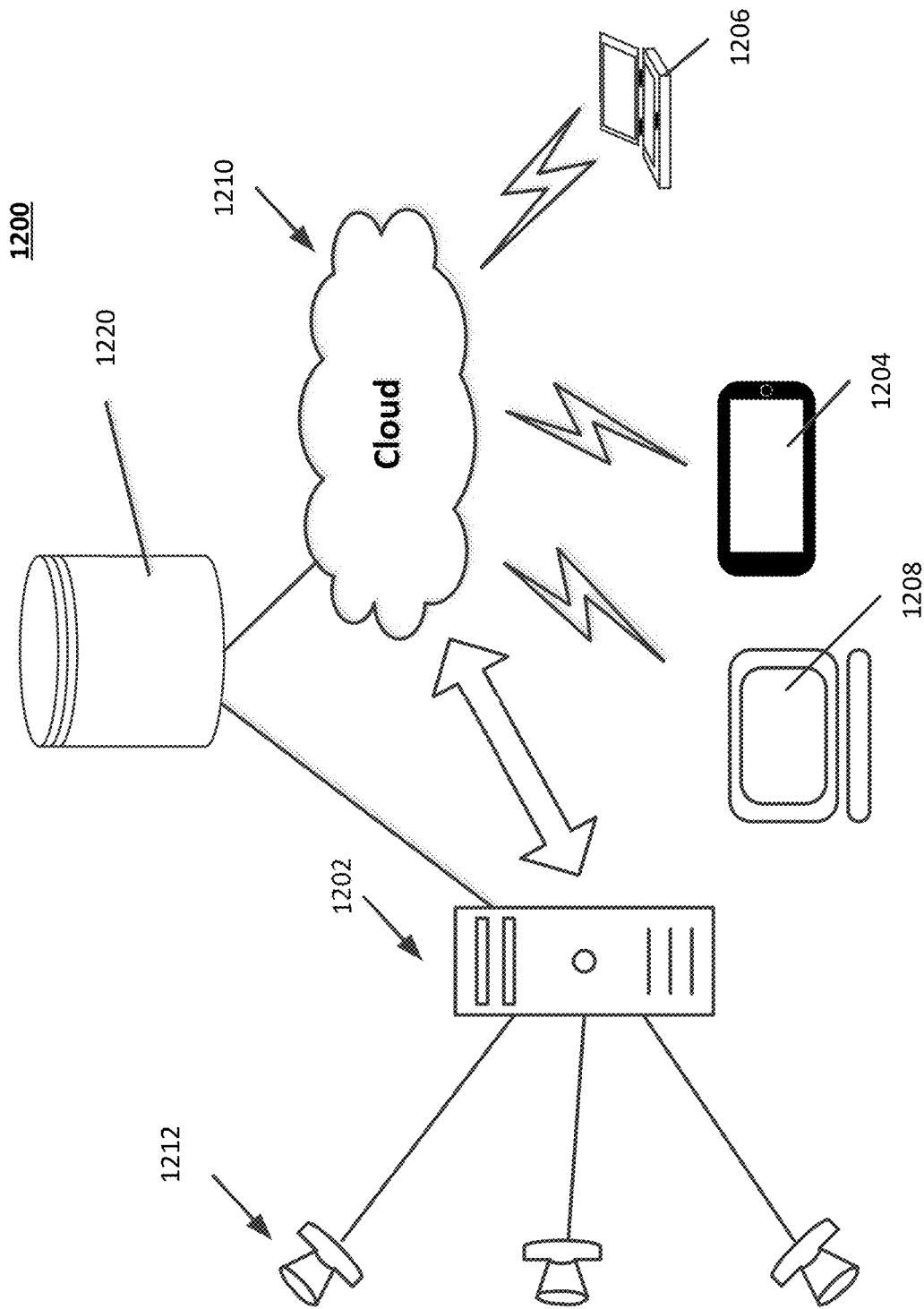
FIG. 12 is a diagram for a multiple camera surveillance system.

FIG. 12 is a diagram for a multiple camera surveillance system. In one non-limiting embodiment, multiple cameras 1212 may be connected in a network, which can be either wired or wireless. Multiple cameras 1212 may be connected to a common server computer 1202. The PS-ARM can be performed in the server computer 1202 as images are received from the cameras 1212. The surveillance system 1200 includes a database system 1220. The server computer 1202 may include a connected to a cloud service 1210. The database system 1220 may be a stand-alone system or may be a service in the cloud service 1210. Various mobile devices 1204, 1206 may communicate with the cloud service 1210.

The database system 1220 may maintain data for the multiple cameras 1212, including, but not limited to, a camera ID, camera type, location, IP address, owner/operator, building address, camera characteristics. The database system 1220 may maintain records and logs of camera recordings. The database system 1220 may store query person images. The database system 1220 can store camera videos.

In an embodiment, the surveillance system 1200 may include a software application for monitoring, controlling, and viewing results that may be performed in a mobile device 1204, tablet computer, laptop computer 1206 or desktop computer 1208. The software application may display status information in a manner described with regards to FIGS. 10, 11.

Figure 13:
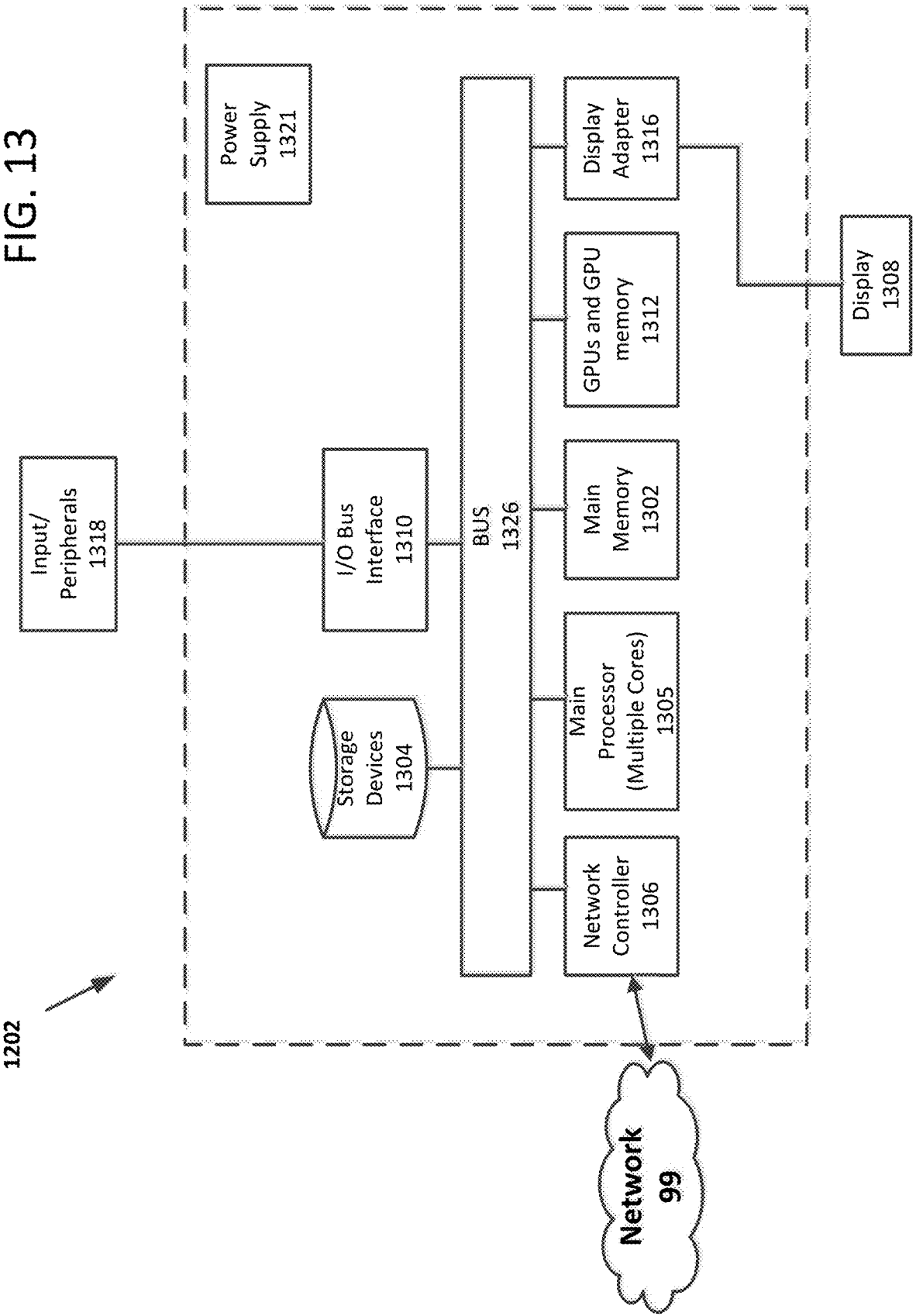
FIG. 13 is a block diagram of a computer system in the surveillance system of FIG. 12.

FIG. 13 is a block diagram of a computer system in the surveillance system of FIG. 12. The example computer system is a server or workstation for implementing the machine learning training and inference methods according to an exemplary aspect of the disclosure. The machine learning training and inference methods may be a computer program stored in a computer readable storage medium, which can be any non-volatile storage medium, including, but not limited to, a Flash drive, CD-ROM, DVD, as well as in a cloud service, for download to the computer system. The computer system may be an AI workstation running an operating system, for example Ubuntu Linux OS, Windows, a version of Unix OS, or Mac OS. The computer system may also be a mobile device, such as a smartphone or tablet, running a mobile operating system. The computer system 1300 may include one or more central processing units (CPU) 1350 having multiple cores. The computer system 1300 may include a graphics board 1312 having multiple GPUs, each GPU having GPU memory. The graphics board 1312 may perform many of the mathematical operations of the disclosed machine learning methods. The computer system 1300 includes main memory 1302, typically random access memory RAM, which contains the software being executed by the processing cores 1350 and GPUs 1312, as well as a non-volatile storage device 1304 for storing data and the software programs. Several interfaces for interacting with the computer system 1300 may be provided, including an I/O Bus Interface 1310, Input/Peripherals 1318 such as a keyboard, touch pad, mouse, Display Adapter 1316 and one or more Displays 1308, and a Network Controller 1306 to enable wired or wireless communication through a network 99. The interfaces, memory and processors may communicate over the system bus 1326. The computer system 1300 includes a power supply 1321, which may be a redundant power supply.

In some embodiments, the computer system 1300 may include a server CPU and a graphics card, in which the GPUs have multiple cores. In some embodiments, the computer system 1300 may include a machine learning engine 1312 having multiple machine learning cores.

Numerous modifications and variations of the present invention are possible in light of the above teachings. It is therefore to be understood that within the scope of the appended claims, the invention may be practiced otherwise than as specifically described herein.

The invention claimed is:

1. A video system for person search, comprising:
at least one video camera for capturing video images;
a display device; and
a computer system having processing circuitry and memory,
the processing circuitry configured to:
receive a target query person,
perform machine learning using a deep learning network to determine person images, from among the video images, matching the target query person, the deep learning network having
a person detection branch;
a person re-identification branch; and
an attention-aware relation mixer (ARM) connected to the person detection branch and to the person re-identification branch,
the attention-aware relation mixer (ARM) including:
a relation mixer having spatial and channel mixer that performs spatial attention followed by spatial mixing by emphasizing local spatial regions of a person using a spatial attention before globally mixing the local spatial regions across all spatial regions, channel attention followed by channel mixing, and an input-output skip connection configured to perform feature re-using within the relation mixer, and
a joint spatio-channel attention layer that utilizes 3D attention weights to modulate 3D spatio-channel region of interest features and aggregate the features with output of the relation mixer; and
the display device is configured to display matching person images for the person search,
wherein in the deep learning network the person detection branch has a region of interest alignment (RoIAlign) block for region of interest alignment and a shared convolution (res5) block,
the person re-identification branch having a RoIAlign block and a shared convolution block, and
each said branch is connected to the attention-aware relation mixer (ARM) between the respective RoIAlign block and shared convolution block.

2. The video system of claim 1, wherein the at least one video camera includes a first and a second video cameras,
wherein the first video camera has a first field of view and the second video camera has a second field of view,
wherein the first field of view is non-overlapping with the second field of view, and
wherein the deep learning network determines that at least one first person image from the first video camera and at least one second person image from the second video camera match the target query person.

3. The video system of claim 1, wherein the relation mixer further comprises a spatial mixer that performs the spatial mixing and a channel mixer for performing the pointwise feature refinement.

4. The video system of claim 3, wherein the spatial mixer includes a spatial attention layer.

5. The video system of claim 1, wherein the memory stores video information in association with the captured video images,
wherein the video information includes time information and camera information.

6. The video system of claim 5, wherein the at least one camera includes a first and a second video cameras,
wherein the first and the second video cameras are located on a building structure,
wherein the deep learning network determines that at least one first person image from the first video camera and at least one second person image from the second video camera match the target query person, and
wherein the display device is further configured to display matching person images in association with date and time information, camera identification information, and identification information for the target query person.

7. The video system of claim 6, wherein the display device is further configured to display in real time the location and time information of video cameras that identified the target query person.

8. The video system of claim 5, wherein the at least one camera includes a first and a second video cameras,
wherein the first and the second video cameras are located in a vehicle cabin and the target query person is a driver of the vehicle,
wherein the deep learning network determines that at least one first person image from the first video camera and at least one second person image from the second video camera match the target query person, and
wherein the display device is further configured to display matching person images in association with behavior information of the driver in order to monitor the driver at different points in time.

9. A non-transitory computer readable storage medium storing a computer program for person search, which when executed by processing circuitry performs a method comprising:
receiving a target query person,
performing machine learning using a deep learning network to determine person images, from among video images captured by at least one video camera, that match the target query person, the deep learning network having
a person detection branch;
a person re-identification branch; and
an attention-aware relation mixer (ARM) connected to the person detection branch and to the person re-identification branch,
the attention-aware relation mixer (ARM) including:
a relation mixer having spatial and channel mixer that performs spatial attention followed by spatial mixing by emphasizing local spatial regions of a person using a spatial attention before globally mixing the local spatial regions across all spatial regions, channel attention followed by channel mixing, and an input-output skip connection configured to perform feature re-using within the relation mixer, and
a joint spatio-channel attention layer that utilizes 3D attention weights to modulate 3D spatio-channel region of interest features and aggregate the features with output of the relation mixer; and
displaying the matching person images for the person search,
wherein in the deep learning network the person detection branch has a region of interest alignment (RoIAlign) block for region of interest alignment and a non-shared convolution (res5) block,
the person re-identification branch having a RoIAlign block and a non-shared convolution block, and
each said branch is connected to the attention-aware relation mixer (ARM) between the respective RoIAlign block and non-shared convolution block.

10. The non-transitory computer readable storage medium of claim 9, wherein the at least one video camera includes a first and a second video cameras,
wherein the first video camera has a first field of view and the second video camera has a second field of view, and
wherein the first field of view is non-overlapping with the second field of view, and
wherein the method further comprises: determining, by the deep learning network, that at least one first person image from the first video camera and at least one second person image from the second video camera match the target query person.

11. The non-transitory computer readable storage medium of claim 9, wherein the relation mixer further comprises a spatial mixer that performs the spatial mixing and a channel mixer for performing the pointwise feature refinement.

12. The non-transitory computer readable storage medium of claim 11, wherein the spatial mixer includes a spatial attention layer.

13. The non-transitory computer readable storage medium of claim 9, wherein the storage medium stores video information in association with the captured video images,
wherein the video information includes time information and camera information.

14. The non-transitory computer readable storage medium of claim 13, wherein the at least one camera includes a first and a second video cameras,
wherein the first and the second video cameras are located on a building structure,
the method further comprising;
determining, by the deep learning network, that at least one first person image from the first video camera and at least one second person image from the second video camera match the target query person, and
displaying matching person images in association with date and time information, camera identification information, and identification information for the target query person.

15. The non-transitory computer readable storage medium of claim 14, further comprising:
displaying in real time the location and time information of video cameras that identified the target query person.

16. The non-transitory computer readable storage medium of claim 13, wherein the at least one camera includes a first and a second video camera
wherein the first and the second video cameras are located in a vehicle cabin and the target query person is a driver of the vehicle,
wherein the method further comprising;
determining, by the deep learning network, that at least one first person image from the first video camera and at least one second person image from the second video camera match the target query person, and
displaying matching person images in association with behavior information of the driver in order to monitor the driver at different points in time.

* * * * *